(12) United States Patent
Sakuma et al.

(10) Patent No.: US 11,033,163 B2
(45) Date of Patent: Jun. 15, 2021

(54) MOTOR MODULE AND VACUUM CLEANER

(71) Applicant: Nidec Corporation, Kyoto (JP)

(72) Inventors: Yuuichi Sakuma, Kyoto (JP); Jun Murakami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 343 days.

(21) Appl. No.: 16/115,640

(22) Filed: Aug. 29, 2018

(65) Prior Publication Data

US 2019/0069742 A1 Mar. 7, 2019

(30) Foreign Application Priority Data

Sep. 5, 2017 (JP) .............................. JP2017-170183

(51) Int. Cl.
*A47L 9/00* (2006.01)
*A47L 5/24* (2006.01)
(Continued)

(52) U.S. Cl.
CPC ............... *A47L 9/0081* (2013.01); *A47L 5/24* (2013.01); *A47L 9/22* (2013.01); *A47L 9/24* (2013.01); *A47L 9/322* (2013.01); *F04D 19/002* (2013.01); *F04D 29/665* (2013.01); *F04D 29/703* (2013.01); *H02K 5/20* (2013.01);
(Continued)

(58) Field of Classification Search
CPC . A47L 5/24; A47L 9/0081; A47L 9/22; A47L 9/24; A47L 9/322; F04D 19/002; F04D 25/06; F04D 25/0673; F04D 25/08; F04D 25/082; F04D 25/084; F04D 29/441; F04D 29/522; F04D 29/545; F04D 29/5806; F04D 29/663; F04D 29/665;
(Continued)

(56) References Cited

U.S. PATENT DOCUMENTS 7,774,898 B2  8/2010  Hong et al.
8,464,392 B2  6/2013  Sato et al.
(Continued)

FOREIGN PATENT DOCUMENTS

CN      1864612 A    11/2006
CN    101627211 A     1/2010
(Continued)

OTHER PUBLICATIONS

JP-2001271796-A—English Machine Translation (Year: 2001).*
Official Communication issued in corresponding Chinese Patent Application No. 201811000834.7, dated Jul. 31, 2020.

*Primary Examiner* — Marc Carlson
(74) *Attorney, Agent, or Firm* — Keating & Bennett

(57) ABSTRACT

A motor module includes a motor, a fan, and a casing accommodating the motor and the fan therein. The casing includes a tubular main body portion, an intake port, an exhaust port, a motor disposing unit, a flow passage, and a partition unit. The flow passage includes a fan accommodating unit. The partition unit includes a first central partition unit that partitions the fan accommodating unit and the motor disposing unit. The first central partition unit includes a cutout portion provided at at least a portion of the first central partition unit. The motor disposing unit communicates with the fan accommodating unit via the cutout portion. A flow passage sectional area of the motor disposing unit is greater than a flow passage sectional area of the first central partition unit.

16 Claims, 11 Drawing Sheets

(51) Int. Cl.
*A47L 9/32* (2006.01)
*A47L 9/22* (2006.01)
*A47L 9/24* (2006.01)
*F04D 19/00* (2006.01)
*F04D 29/66* (2006.01)
*F04D 29/70* (2006.01)
*H02K 9/04* (2006.01)
*H02K 5/20* (2006.01)
*H02K 5/24* (2006.01)
*F04D 25/08* (2006.01)

(52) U.S. Cl.
CPC ................ H02K 5/24 (2013.01); H02K 9/04 (2013.01); *F04D 25/08* (2013.01)

(58) Field of Classification Search
CPC .... F04D 29/703; H02K 11/0094; H02K 5/20; H02K 5/24; H02K 7/14; H02K 9/06; H02K 9/04
See application file for complete search history.

(56) References Cited

U.S. PATENT DOCUMENTS

| | | | |
|---|---|---|---|
| 2006/0096058 A1* | 5/2006 | Oh | A47L 9/22 15/326 |
| 2006/0213022 A1 | 9/2006 | Oh | |
| 2010/0322762 A1 | 12/2010 | Shirahama et al. | |
| 2018/0110384 A1* | 4/2018 | Sakuma | A47L 5/24 |
| 2018/0140145 A1* | 5/2018 | Hayamitsu | A47L 5/22 |
| 2018/0216635 A1* | 8/2018 | Hayamitsu | A47L 9/0072 |
| 2019/0069737 A1* | 3/2019 | Sakuma | A47L 9/0081 |

FOREIGN PATENT DOCUMENTS

| | | | | |
|---|---|---|---|---|
| DE | 19739613 A1 | * | 3/1998 | ........ A47L 9/0081 |
| EP | 1 723 883 A2 | | 11/2006 | |
| JP | 2001271796 A | * | 10/2001 | |
| JP | 2011-030777 A | | 2/2011 | |
| JP | 2012-120634 A | | 6/2012 | |
| JP | 5197233 B2 | | 5/2013 | |
| JP | 5350732 B2 | | 11/2013 | |
| WO | WO-2004004535 A1 | * | 1/2004 | ........ A47L 9/0081 |
| WO | WO-2007012537 A1 | * | 2/2007 | ...... F16L 55/02718 |

* cited by examiner

MOTOR MODULE AND VACUUM CLEANER

CROSS REFERENCE TO RELATED APPLICATIONS

This application claims the benefit of priority to Japanese Patent Application No. 2017-170183 filed on Sep. 5, 2017. The entire contents of this application are hereby incorporated herein by reference.

BACKGROUND OF THE INVENTION

1. Field of the Invention

The present disclosure relates to a motor module and a vacuum cleaner including a motor module.

2. Description of the Related Art

In the related art, a motor and a fan are mounted on a device that requires a suction force of a vacuum cleaner or the like. In recent years, with an increase in number of multi-dwelling houses and the like, suppression of noise caused by an airflow generated by rotation of the fan inside the vacuum cleaner has proceeded.

The vacuum cleaner of the related art opens and closes an air duct in accordance with the exhaust pressure from the electric blower on the inside of the main body case. In addition, noise is reduced by forming a resonance type muffler and an expansion muffler while switching the mufflers. However, in the structure of the publication, since a mechanism for switching the resonance type muffler and the expansion muffler to each other is included, the structure becomes complicated. Therefore, there is a concern that the number of components increases and the cost increases. In addition, there is a concern that the assembling process becomes complicated and production efficiency decrease.

Further, in a handy cleaner of the related art, a circular hole is provided on a rectangular parallelepiped side wall that opposes an air blowing mechanism formed of a dust suction port and a fan unit in a housing. The circular hole communicates with the inside of the housing and a resonance chamber formed by combining a molded part divided by half of the housing. Accordingly, by forming a Helmholtz type resonator, noise generated from the air blowing mechanism is reduced. However, in the structure of the publication, since the resonance type muffler reduces only the noise of a specific frequency, there is a concern that noise in a wide frequency band generated by driving the vacuum cleaner cannot be reduced.

SUMMARY OF THE INVENTION

Exemplary embodiments of the present disclosure provide structures capable of reducing noise in a wide frequency band while decreasing the number of components in a motor module of a vacuum cleaner including a motor and a fan.

According to an exemplary embodiment of the present disclosure, a motor module includes a motor including a rotating unit that rotates around a rotating axis; a fan that is disposed on a first side of the motor in an axial direction and rotates together with the rotating unit; and a casing that accommodates the motor and the fan therein, in which the casing includes a tubular main body portion that extends in the axial direction, an intake port disposed on a first side of the fan in the axial direction, an exhaust port disposed on a second side of the fan in the axial direction and on an outer side of the motor in a radial direction, a motor disposing unit in which the motor is disposed, a flow passage which is a space that connects the intake port and the exhaust port to each other on an interior of the main body portion, and one or a plurality of partition units which are disposed on an interior of the flow passage and partition the flow passage, in which the flow passage includes a fan accommodating unit in which the fan is accommodated and which directly communicates with the intake port, in which the partition unit includes a first central partition unit that partitions the fan accommodating unit and the motor disposing unit, in which the first central partition unit includes a cutout portion provided at at least a portion of the first central partition unit, and in which the motor disposing unit communicates with the fan accommodating unit via the cutout portion.

According to an exemplary embodiment of the present disclosure, the cutout portion is provided at at least a portion of the first central partition unit that partitions the fan accommodating unit that directly communicates with the intake port and the motor disposing unit in which the motor is disposed, on the interior of the motor module. An expansion muffler is defined by the motor disposing unit that communicates with the fan accommodating unit via the cutout portion. Accordingly, noise in a wide frequency band is efficiently reduced while decreasing the number of components.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An example of a vacuum cleaner having a motor module is disclosed below. In addition, in the disclosure, a direction parallel to a rotating axis of a motor which will be described later is referred to as "axial direction", a direction orthogonal to the rotating axis of the motor is referred to as "radial direction", and a direction along the circumference around the rotating axis of the motor is referred to as "circumferential direction", respectively. In addition, in the disclosure, the shape and positional relationship of each portion will be described with respect to a rechargeable battery that will be described later considering a handle portion side as an upper side. However, due to the definition of the up-down direction, there is no intention to limit the orientation of the motor module during manufacture and use. Further, in the disclosure, "parallel direction" also includes a substantially parallel direction. Further, in the disclosure, "orthogonal direction" also includes a substantially orthogonal direction.

1. First Embodiment 1-1. Configuration of Vacuum Cleaner

Figure 1:
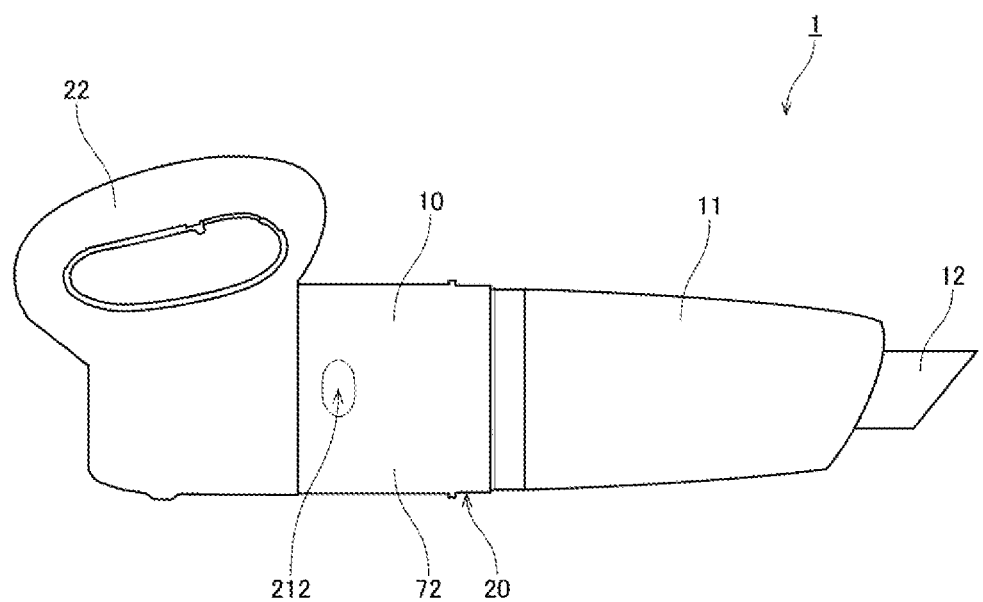
FIG. 1 is a side view of a vacuum cleaner according to a first exemplary embodiment of the present disclosure.

FIG. 1 is a side view of a vacuum cleaner 1 according to a first embodiment. As illustrated in FIG. 1, the vacuum cleaner 1 has a motor module 10, a dust separating unit 11, and a nozzle 12. The vacuum cleaner 1 is a so-called handy type vacuum cleaner.

Figure 2:
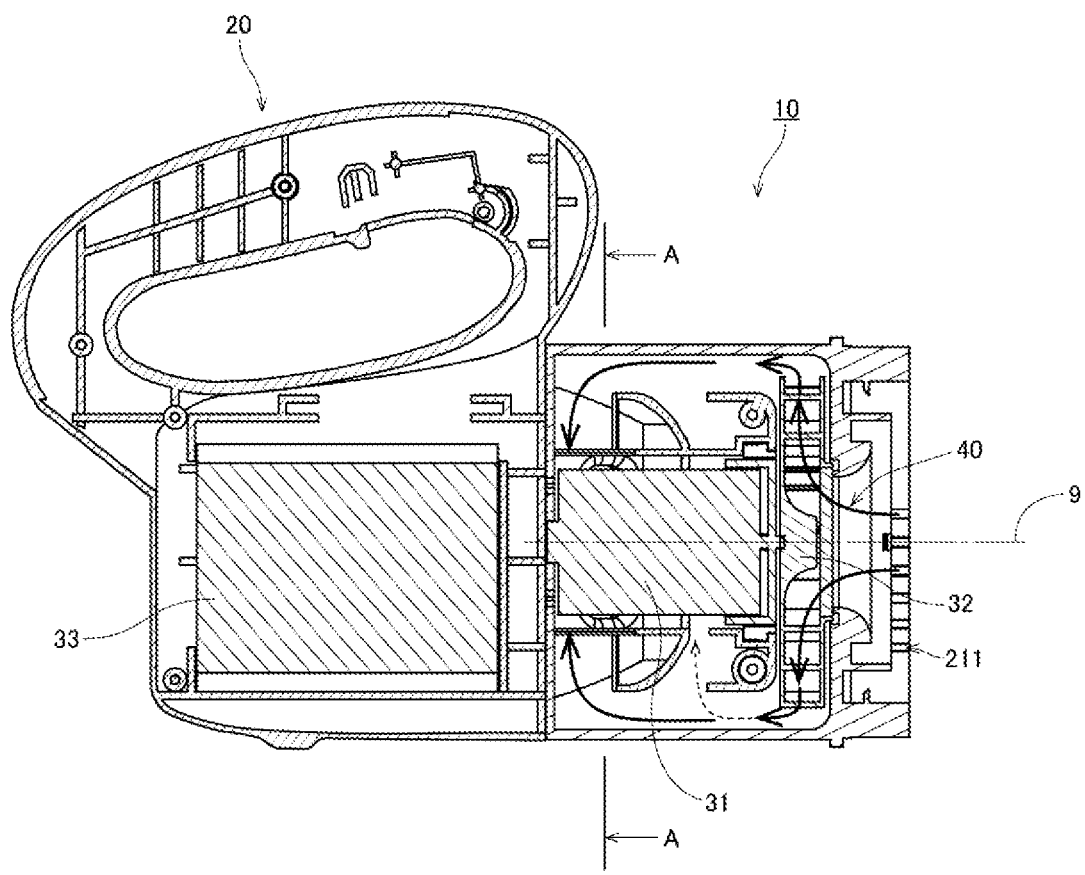
FIG. 2 is a sectional view of a motor module according to the first exemplary embodiment of the present disclosure.

FIG. 2 is a sectional view of the motor module 10. As illustrated in FIG. 2, the motor module 10 includes a casing 20, a motor 31, a fan 32, and a rechargeable battery 33.

The casing 20 accommodates the motor 31, the fan 32, and the rechargeable battery 33 therein, respectively. The casing 20 includes an intake port 211 and an exhaust port 212 which will be described later. The intake port 211 is disposed on one side of the fan 32 in the axial direction and communicates with the dust separating unit 11 and a space inside the casing 20 in which the fan 32 is accommodated. The exhaust port 212 is provided on a side surface of the casing 20. In addition, the casing 20 forms a flow passage 40 which is a space that connects the intake port 211 and the exhaust port 212 to each other on the inside thereof. The detailed configuration of the casing 20 will be described later.

The motor 31 is a brushless motor. The motor 31 has a rotating unit that rotates around a rotating axis 9. The fan 32 is disposed on one side of the motor 31 in the axial direction. Further, the fan 32 rotates together with the rotating unit of the motor 31. The fan 32 is a so-called centrifugal fan that generates an airflow oriented toward the outer side in the radial direction by rotation. Accordingly, the fan 32 generates the airflow that flows from the intake port 211 to the exhaust port 212 in the flow passage 40 of the casing 20. The rechargeable battery 33 supplies driving power to the motor 31.

The dust separating unit 11 is disposed on one side of the motor module 10 in the axial direction. A nozzle 12 is an intake head disposed on one side of the dust separating unit 11 in the axial direction. The dust separating unit 11 separates dust and dirt contained in the airflow suctioned from the nozzle 12, from the airflow. In addition, the dust separating unit 11 may separate dust and dirt by a paper pack or may separate dust and dirt by a cyclone separator.

When the vacuum cleaner 1 is driven, the motor 31 is driven and the fan 32 rotates. In accordance with this, the airflow that is oriented toward the exhaust port 212 through the inside of the dust separating unit 11, the intake port 211, and the inside of the motor module 10, from the nozzle 12, is generated. Accordingly, dust and dirt are suctioned together with the airflow from the nozzle 12. Dust and dirt are removed in the dust separating unit 11 from the airflow that flows in from the nozzle 12. In addition, the airflow from which the dust and dirt have been removed passes through the motor module 10 and is discharged from the exhaust port 212.

1-2. Configuration of Casing

Next, the detailed configuration of the casing 20 will be described later. Hereinafter, FIGS. 1 and 2 will be appropriately referred to together with FIGS. 3 to 6 which will be described later.

Figure 3:
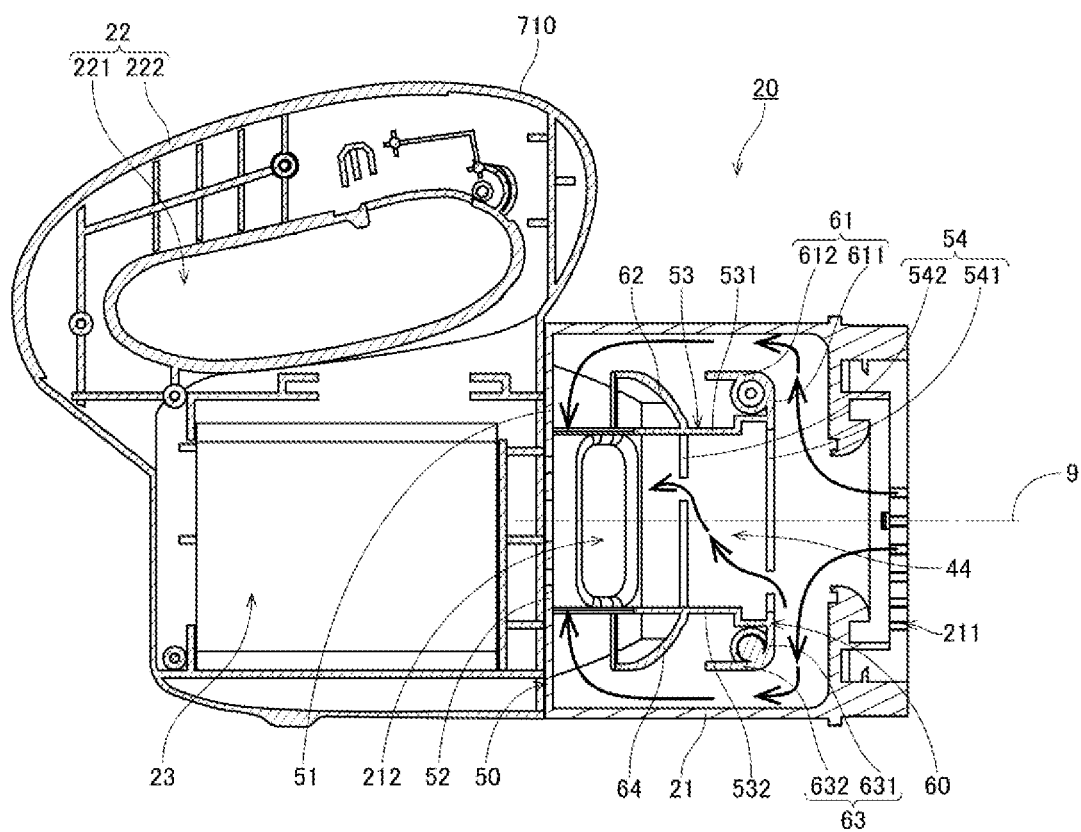
FIG. 3 is a sectional view of a casing according to the first exemplary embodiment of the present disclosure.
Figure 4:
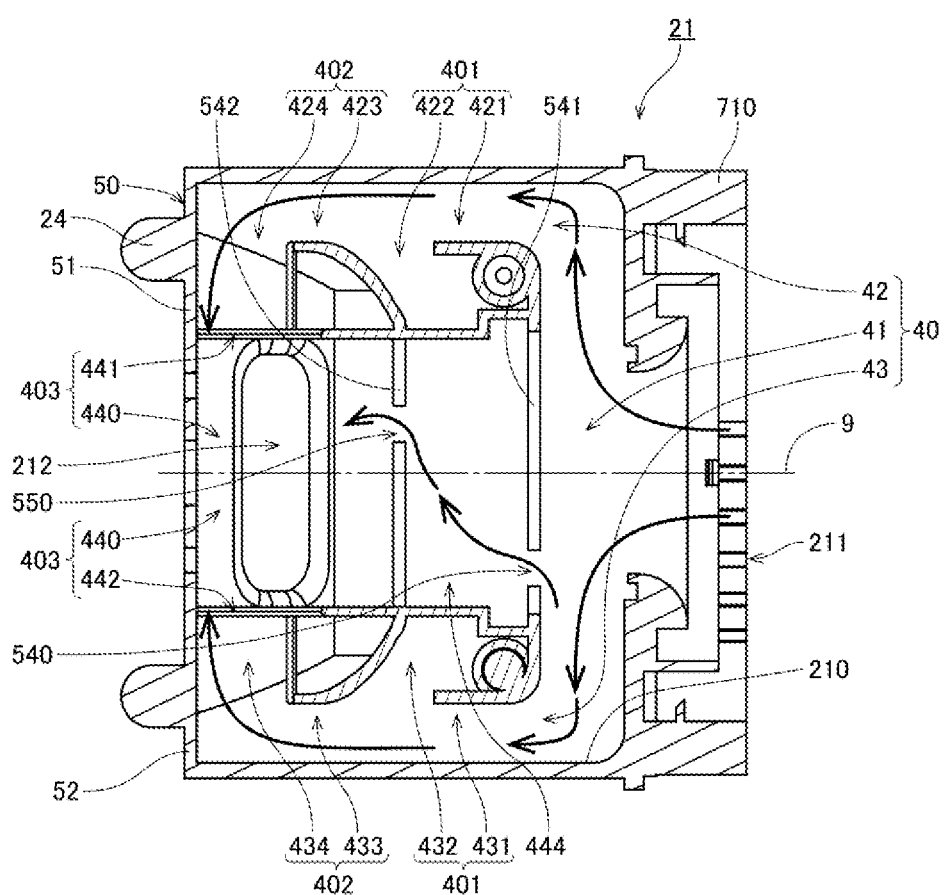
FIG. 4 is a sectional view of a main body portion of the casing according to the first exemplary embodiment of the present disclosure.

FIG. 3 is a sectional view of the casing 20. FIG. 4 is a sectional view of a main body portion 21 which will be described later and which is a part having the flow passage 40 that connects the intake port 211 and the exhaust port 212 to each other in the casing 20. As illustrated in FIG. 3, the casing 20 includes the main body portion 21, a handle portion 22, and a rechargeable battery accommodating unit 23.

The main body portion 21 is a tubular part that extends in the axial direction. The intake port 211 is provided on one side of the fan 32 in the axial direction in the main body portion 21. In addition, the exhaust port 212 is provided on the other side of the fan 32 in the axial direction and on the outer side of the motor 31 in the radial direction in the main body portion 21. The exhaust port 212 is a through-hole that communicates with the inside and the outside of the casing 20. In addition, in the main body portion 21, the flow passage 40 which is a space that connects the intake port 211 and the exhaust port 212 to each other is formed. In addition, as will be described later, a motor disposing unit 44 in which the motor 31 is disposed is formed on the inside the main body portion 21.

On the other side of the main body portion 21 in the axial direction in the casing 20, the handle portion 22 and the rechargeable battery accommodating unit 23 are provided. The handle portion 22 and the rechargeable battery accommodating unit 23 are connected to the main body portion 21 by, for example, a connecting member 24 illustrated in FIG. 4. Further, the handle portion 22 is disposed above the rechargeable battery accommodating unit 23. Here, the handle portion 22 is configured with a handle hole 221 that penetrates in a left-right direction perpendicular to the axial direction and the up-down direction and a gripping unit 222 that extends in the axial direction above the handle hole 221. The rechargeable battery accommodating unit 23 accommodates the rechargeable battery 33 therein.

Further, the casing 20 includes a wall portion 50 for partitioning the space including the flow passage 40 therein, and a partition unit 60.

The wall portion 50 partitions the internal space of the casing 20 into the flow passage 40 and a part other than the flow passage 40. Accordingly, for example, generation of noise due to the airflow that strikes the parts, such as the handle portion 22, the rechargeable battery accommodating unit 23, and the rechargeable battery 33, is suppressed. Further, regardless of the shapes of the handle portion 22, the rechargeable battery accommodating unit 23, and the rechargeable battery 33, the flow passage resistance in the flow passage 40 and the muffling effect which will be described later can be kept constant. The wall portion 50 is configured with an upper wall portion 51 and a lower wall portion 52. The upper wall portion 51 is a part positioned above the rotating axis 9 in the wall portion 50. The lower wall portion 52 is a part positioned below the rotating axis 9 in the wall portion 50.

The partition unit 60 is a plate-like member which is disposed on the inside of the flow passage 40 and partitions the flow passage 40. The partition unit 60 includes an inner partition unit 53, a central partition unit 54, and outer partition units 61 to 64.

The inner partition unit 53 is a member disposed between at least a part of the motor 31 accommodated on the inside of the casing 20 and the inner wall 210 of the main body portion 21. The inner partition unit 53 extends in a plate-like shape in the axial direction. In addition, the inner partition unit 53 partitions the flow passage 40 such that at least a part of the flow passage forms a shape closed by the inner wall 210 and the inner partition unit 53 of the main body portion 21 when viewed from one side in the axial direction. In addition, the inner partition unit 53 is configured with a first inner partition unit 531 and a second inner partition unit 532. The first inner partition unit 531 is a part that extends in the axial direction above the rotating axis 9. The second inner partition unit 532 is a part that extends in the axial direction below the rotating axis 9.

The central partition unit 54 is configured with a first central partition unit 541 and a second central partition unit 542. The first central partition unit 541 is a plate-like part that expands in the radial direction between the motor 31 and the fan in the axial direction and on the outer side in the radial direction from the connecting location between the rotating unit of the motor 31 and the fan 32. The first central partition unit 541 partitions a fan accommodating unit 41 (which will be described later) and a motor disposing unit 44 (which will be described later) in the axial direction. In addition, "partitioning in the axial direction" is intended to mean "partitioning the space into a space on one side in the axial direction and a space on the other side in the axial direction". The second central partition unit 542 is a plate-like part that expands in the radial direction at a position that overlaps the motor 31 in the radial direction and on the outer side in the radial direction from the motor 31. The second central partition unit 542 partitions the motor disposing unit 44 (which will be described later) in the axial direction. In addition, the detailed configuration of the central partition unit 54 including the first central partition unit 541 and the second central partition unit 542 will be described later.

The outer partition unit 55 includes first outer partition units 61 and 63 and second outer partition units 62 and 64. The first outer partition unit 61 includes a first outer plate portion 611 and a first outer bent portion 612. The first outer plate portion 611 further expands to the outer side in the radial direction from an end portion of the first central partition unit 541 on the outer side in the radial direction. In other words, the first outer plate portion 611 expands substantially perpendicularly to the axial direction on one side of the motor 31 in the axial direction and on the other side of the fan 32 in the axial direction. The first outer bent portion 612 extends from the end portion on the outer side of the first outer plate portion 611 in the radial direction to the other side in the axial direction. The second outer partition unit 62 extends from a part of the first inner partition unit 531 to the outer side in the radial direction and the other side in the axial direction, on the other side of the first outer partition unit 61 in the axial direction and on one side of the upper wall portion 51 in the axial direction. The first outer partition unit 63 has a shape obtained by vertically reversing the first outer partition unit 61 considering the rotating axis 9 as a boundary. The first outer partition unit 63 includes a first outer plate portion 631 and a first outer bent portion 632. The second outer partition unit 64 has a shape obtained by vertically reversing the second outer partition unit 62 considering the rotating axis 9 as a boundary.

As illustrated in FIGS. 3 and 4, by providing the wall portion 50, the inner partition unit 53, the central partition unit 54, and the outer partition units 61 to 64 on the inside of the main body portion 21, a fan accommodating unit 41 that accommodates the fan 32 therein, and an upper flow passage 42 and a lower flow passage 43 that extend from the fan accommodating unit 41 to the other side in the axial direction are formed in the flow passage 40. The details of the flow passages will be described below.

First, the fan accommodating unit 41 is positioned on the inside of the casing 20 and on the other side of the intake port 211 in the axial direction, and on one side of the first outer partition units 61 and 63 and the first central partition unit 541 in the axial direction. The fan accommodating unit 41 directly communicates with the intake port 211. Further, as described above, the airflow oriented toward the outer side in the radial direction is generated by the rotation of the fan 32 accommodated in the fan accommodating unit 41. The flow passage 40 of the embodiment branches to the upper flow passage 42 and the lower flow passage 43 on the downstream side of the fan 32. As described above, on the inside of the casing 20, the first outer plate portions 611 and 631 and the first central partition unit 541 are provided on the other side of the fan accommodating unit 41 in the axial direction. Therefore, the airflow advances further to the other side in the axial direction via an upper first communication path 421 or a lower first communication path 431. In addition, the upper first communication path 421 is a space that communicates in the axial direction between the first outer partition unit 61 and the inner wall 210 of the main body portion 21. The lower first communication path 431 is a space that communicates with the first outer partition unit 63 in the axial direction with the inner wall 210 of the main body portion 21 therebetween.

Next, on the other side of the upper first communication path 421 in the axial direction, an upper first muffling chamber 422 that communicates with the fan accommodating unit 41 via the upper first communication path 421 is formed. In other words, the fan accommodating unit 41 and the upper first muffling chamber 422 are partitioned from each other in the axial direction by the first outer partition unit 61 disposed therebetween. The upper first muffling chamber 422 is a space positioned on the other side of the first outer partition unit 61 and the upper first communication path 421 in the axial direction, on the upper side of the first inner partition unit 531, on the inner side of the inner wall 210 of the main body portion 21 in the radial direction, and on one side of the second outer partition unit 62 and an upper second communication path 423 which will be described later in the axial direction. In addition, on the other side of the lower first communication path 431 in the axial direction, a lower first muffling chamber 432 that communicates with the fan accommodating unit 41 via the lower first communication path 431 is formed. The lower first muffling chamber 432 has a shape obtained by vertically reversing the upper first muffling chamber 422 considering the rotating axis 9 as a boundary.

In the upper flow passage 42, the airflow that has reached the upper first muffling chamber 422 via the upper first communication path 421 advances further to the other side in the axial direction via the upper second communication path 423. The upper second communication path 423 is a space that communicates with the second outer partition unit 62 in the axial direction with the inner wall 210 of the main body portion 21 therebetween. Further, in the lower flow passage 43, the airflow that has reached the lower first muffling chamber 432 via the lower first communication path 431 further advances on the other side in the axial direction via the lower second communication path 433. The lower second communication path 433 is a space that communicates with the second outer partition unit 64 in the axial direction with the inner wall 210 of the main body portion 21 therebetween.

An upper second muffling chamber 424 that communicates with the upper first muffling chamber 422 via the upper second communication path 423 is formed on the other side of the upper second communication path 423 in the axial direction. The upper second muffling chamber 424 is a space positioned on the other side of the second outer partition unit 62 and the upper second communication path 423 in the axial direction, on the upper side of the first inner partition unit 531, on the inner side of the inner wall 210 of the main body portion 21 in the radial direction, and on one side of the upper wall portion 51 in the axial direction. In addition, a lower second muffling chamber 434 that communicates with the lower first muffling chamber 432 via the lower second communication path 433 is formed on the other side of the lower second communication path 433 in the axial direction. The lower second muffling chamber 434 has a shape obtained by vertically reversing the upper second muffling chamber 424 considering the rotating axis 9 as a boundary. In addition, the upper second muffling chamber 424 and the lower second muffling chamber 434 indirectly communicate with the exhaust port 212 provided in the motor disposing unit 44 (which will be described later), respectively.

Furthermore, on the other side of the fan accommodating unit 41 in the axial direction, the motor disposing unit 44 is formed. The motor disposing unit 44 is a space positioned on the other side of the first central partition unit 541 in the axial direction, on the lower side of the first inner partition unit 531, on the upper side of the second inner partition unit 532, and on one side of the wall portion 50 in the axial direction. In addition, as described above, the second central partition unit 542 partitions the motor disposing unit 44 in the axial direction. Accordingly, the motor disposing unit 44 forms a third muffling chamber 440 on the other side in the axial direction from the second central partition unit 542, and forms a central muffling chamber 444 on one side in the axial direction from the second central partition unit 542.

In the embodiment, a through-hole that penetrates at least a part in the vicinity of the end portion on the other side of the first inner partition unit 531 in the axial direction in the radial direction is provided. An upper third communication path 441 that communicates with the upper second muffling chamber 424 and the third muffling chamber 440 is formed by the through-hole. The third muffling chamber 440 communicates with the upper second muffling chamber 424 via the upper third communication path 441. The airflow that has reached the upper second muffling chamber 424 advances to the third muffling chamber 440 via the upper third communication path 441. In addition, in the embodiment, a through-hole that penetrates at least a part in the vicinity of the end portion on the other side of the second inner partition unit 532 in the axial direction in the radial direction is provided. A lower third communication path 442 that communicates with the lower second muffling chamber 434 and the third muffling chamber 440 is formed by the through-hole. The third muffling chamber 440 communicates with the lower second muffling chamber 434 via the lower third communication path 442. The airflow that has reached the lower second muffling chamber 434 advances to the third muffling chamber 440 via the lower third communication path 442.

In addition, in the embodiment, the exhaust port 212 described above is provided in the third muffling chamber 440. The third muffling chamber 440 communicates directly with the exhaust port 212. In addition, the third muffling chamber 440 may communicate indirectly with the exhaust port 212 via another space. The airflow that has reached the third muffling chamber 440 via the upper third communication path 441 in the upper flow passage 42 and the airflow that has reached the third muffling chamber 440 via the lower third communication path 442 in the lower flow passage 43 merge with each other and are discharged to the outside of the motor module 10 via the exhaust port 212.

As described above, when the motor 31 is driven to rotate the fan 32, the fan 32 generates the airflow oriented from the upper part of the fan 32 toward the outer side of the fan 32 in the radial direction. Accordingly, on the inside of the fan accommodating unit 41, the airflow oriented from the intake port 211 toward the upper flow passage 42 and the lower flow passage 43 via the first communication paths 421 and 431 is generated. In addition, the airflow is discharged from the exhaust port 212 to the outside of the motor module 10 through the first muffling chambers 422 and 432, the second communication paths 423 and 433, the second muffling chambers 424 and 434, the third communication path 441 and 442, and the third muffling chamber 440.

Here, the flow passage sectional area of the upper first muffling chamber 422 is greater than the flow passage sectional area of the upper first communication path 421. The flow passage sectional area of the lower first muffling chamber 432 is greater than the flow passage sectional area of the lower first communication path 431. Accordingly, the upper first communication path 421 and the upper first muffling chamber 422, and the lower first communication path 431 and the lower first muffling chamber 432 configure a first expansion muffler 401, respectively. In addition, the flow passage sectional area of the upper second muffling chamber 424 is greater than the flow passage sectional area of the upper second communication path 423. The flow passage sectional area of the lower second muffling chamber 434 is greater than the flow passage sectional area of the lower second communication path 433. Accordingly, the upper second communication path 423 and the upper second muffling chamber 424, and the lower second communication path 433 and the lower second muffling chamber 434 configure a second expansion muffler 402, respectively. Furthermore, the flow passage sectional area of the third muffling chamber 440 is greater than the flow passage sectional area of the upper third communication path 441. The flow passage sectional area of the third muffling chamber 440 is greater than the flow passage sectional area of the lower third communication path 442. Accordingly, the upper third communication path 441 and the third muffling chamber 440, and the lower third communication path 442 and the third muffling chamber 440 configure a third expansion muffler 403, respectively.

In addition, the upper first communication path 421 and the upper second communication path 423 are disposed along the inner wall 210 of the main body portion 21, respectively, and at least a part thereof overlaps each other in the axial direction. In addition, the lower first communication path 431 and the lower second communication path 433 are disposed along the inner wall 210 of the main body portion 21, respectively, and at least a part thereof overlaps each other in the axial direction. Accordingly, the airflow oriented toward the other side in the axial direction along the inner wall 210 of the main body portion 21 generated by the fan 32 is likely to enter the first communication paths 421 and 431 and the second communication paths 423 and 433. In other words, the flow passage resistance in the upper flow passage 42 and the flow passage resistance in the lower flow passage 43 decrease. Therefore, the air blowing efficiency of the motor module 10 as a whole can be improved.

In addition, in the embodiment, the upper first communication path 421, the upper second communication path 423, the lower first communication path 431, and the lower second communication path 433 respectively have a crescent shape when the entrance is viewed from one side in the axial direction (refer to FIG. 8 which will be described later). In other words, when viewed from one side in the axial direction, each has a shape closed by one straight line (each of the outer partition units 61 to 64) and one circular arc (inner wall 210 of the main body portion 21). Accordingly, the airflow can further advance to the other side in the axial direction via the communication paths while maintaining the turning in the circumferential direction of the airflow generated by the rotation of the fan 32. As a result, air stagnation on the inside of the casing 20 can be suppressed and the air can be exhausted efficiently.

Figure 5:
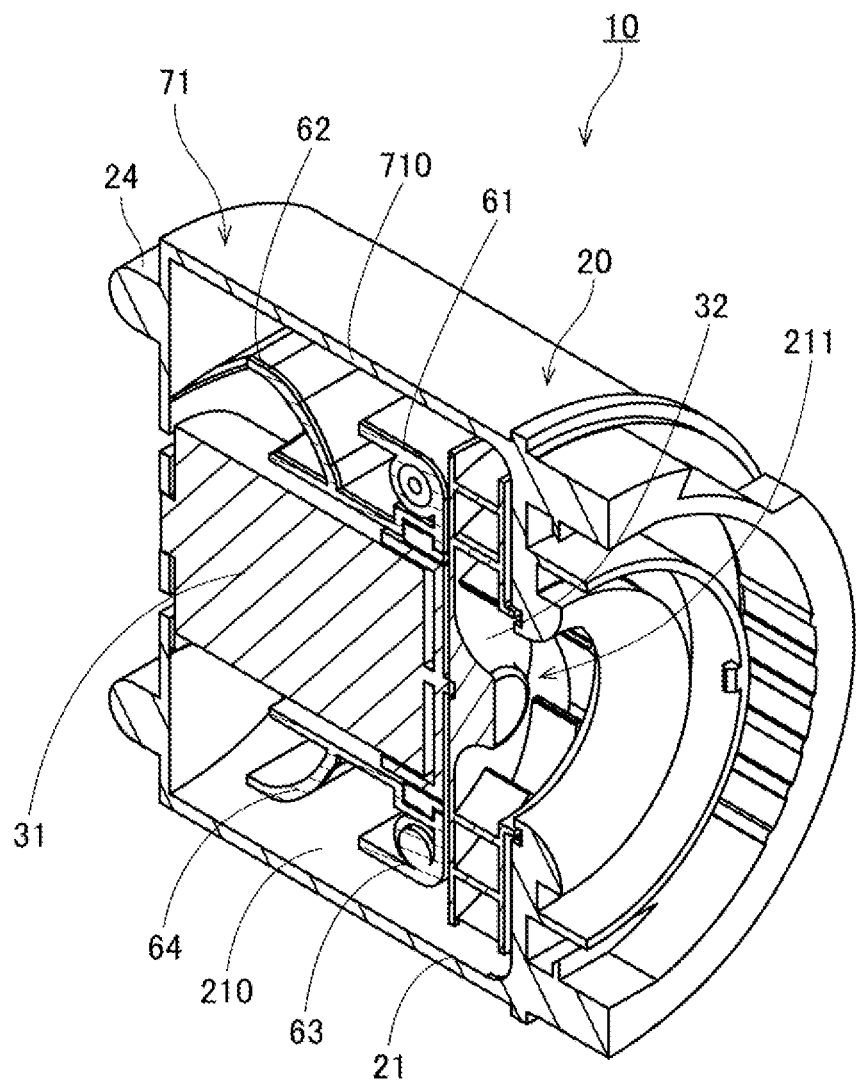
FIG. 5 is a partial sectional perspective view of the motor module according to the first exemplary embodiment of the present disclosure.
Figure 6:
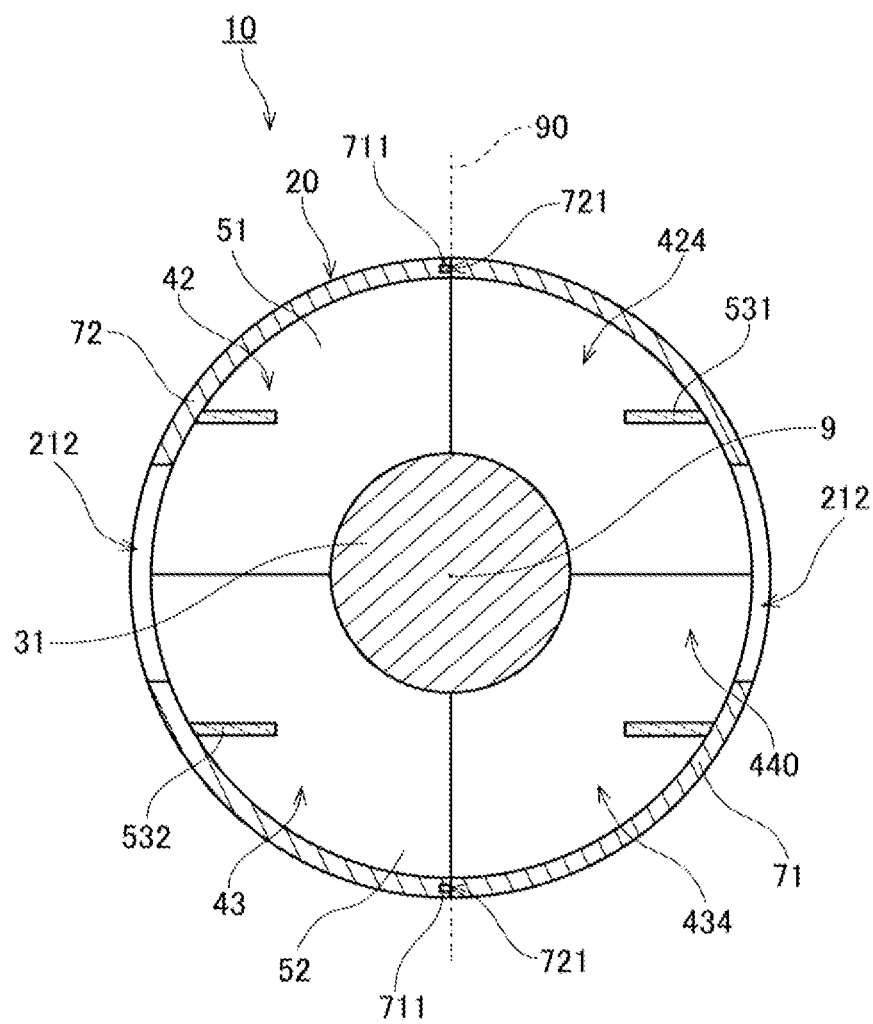
FIG. 6 is a sectional view taken along line VI-VI of the motor module according to the first exemplary embodiment of the present disclosure.

FIG. 5 is a partial sectional perspective view of a part having a flow passage 40 that connects the intake port 211 and the exhaust port 212 to each other in the motor module 10. FIG. 6 is a sectional view taken along line VI-VI of the motor module 10 in FIG. 2. As illustrated in FIGS. 5 and 6, the casing 20 of the embodiment is configured with a first casing 71 and a second casing 72 which are two members obtained by dividing the casing 20 by half. The first casing 71 and the second casing 72 are resin molded articles integrally formed respectively. The first casing 71 has a contact surface 710 that comes into contact with the second casing 72 on a plane 90 through the rotating axis 9. Further, the second casing 72 has a contact surface (not illustrated) that comes into contact with the first casing 71 on the plane 90. The casing 20 is configured to have a substantially symmetrical shape with respect to the plane 90. Therefore, the handle portion 22 is also substantially symmetrical with respect to the plane 90.

In this manner, by configuring the casing 20 with two members that divide the casing 20 by half, the assembly efficiency of each component can be improved in a manufacturing process of the motor module 10. In addition, in the first casing 71 and the second casing 72 divided by half, most parts including the wall portion 50 are formed perpendicularly to the plane 90 and have a substantially symmetrical shape with respect to the plane 90. Accordingly, when forming the first casing 71 and the second casing 72 by injection molding, the number of components of molding can be reduced. Therefore, the manufacturing cost can be reduced. In addition, the first inner partition unit 531, the second inner partition unit 532, the first central partition unit 541, the second central partition unit 542, and each of the outer partition units 61 to 64 may be respectively configured with members formed separately from the first casing 71 and the second casing 72. Furthermore, after the partition unit 60 including the first central partition unit 541 and the second central partition unit 542 is separately formed, the partition unit 60 may be connected so as to protrude from the inner wall 210 of the main body portion 21 to the inside in the first casing 71 and the second casing 72, respectively.

The first casing 71 has a first projection portion 711 that protrudes from the plane 90 toward the second casing 72 side. The second casing 72 has a first recess portion 721 recessed from the plane 90. The first projection portion 711 is fitted into the first recess portion 721. Accordingly, the first casing 71 and the second casing 72 are stably fixed. The first projection portion 711 and the first recess portion 721 are respectively disposed in the vicinity of the outer surface of the casing 20 and around the handle hole 221.

Further, the first casing 71 has screw fixing holes (not illustrated) formed perpendicularly to the plane 90. The second casing 72 has screw holding holes (not illustrated) formed perpendicularly to the plane 90. A screw thread part of a screw that penetrates the screw holding hole (not illustrated) is screwed to a screw fixing hole (not illustrated). Accordingly, the first casing 71 and the second casing 72 are more stably fixed.

1-3. Configuration of Central Partition Unit

Next, the detailed configuration of the central partition unit 54 will be described. Hereinafter, FIGS. 1 to 6 will be appropriately referred to together with FIGS. 7 to 9 which will be described later.

Figure 7:
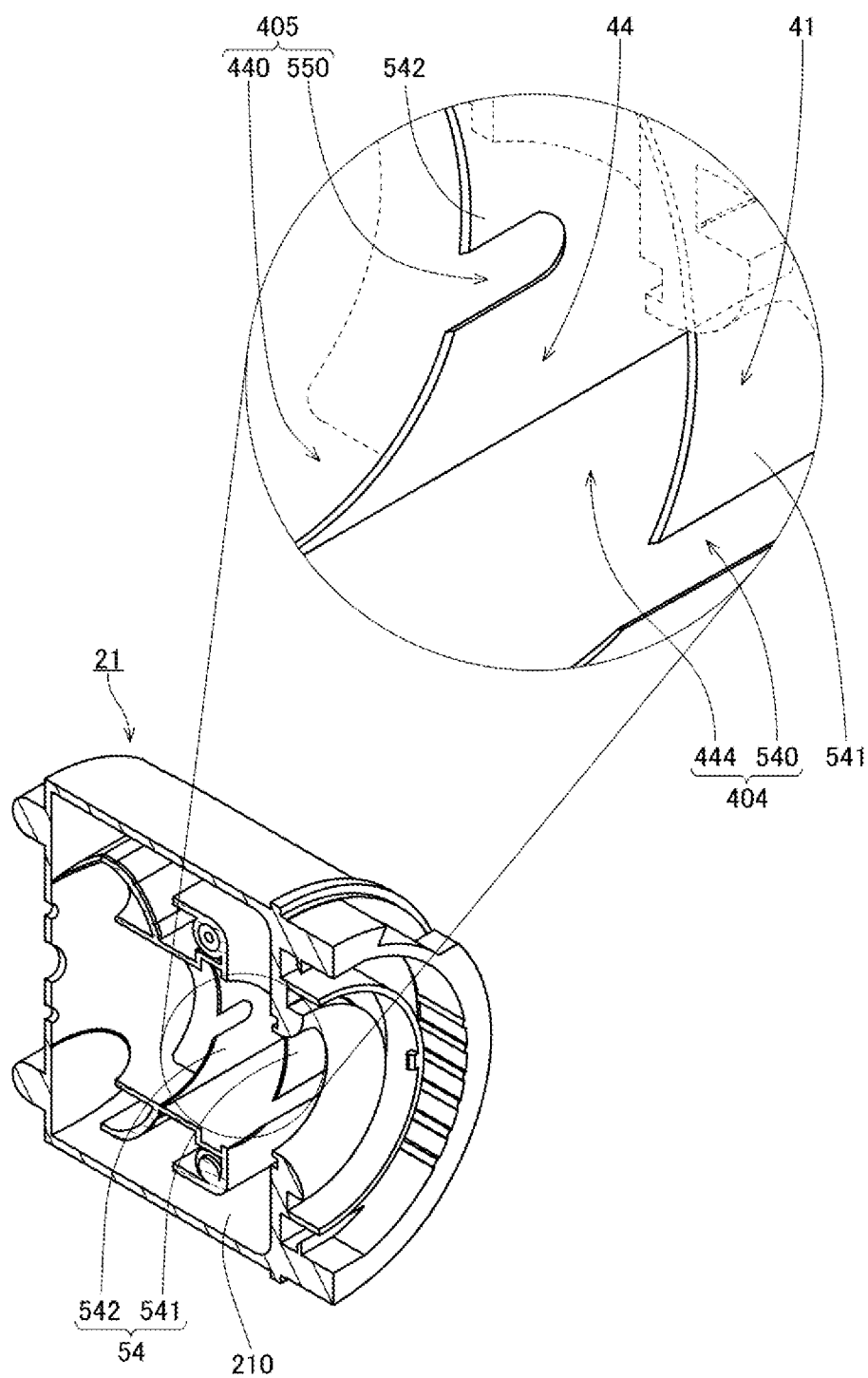
FIG. 7 is a sectional perspective view of a main body portion of the casing according to the first exemplary embodiment of the present disclosure.

FIG. 7 is a sectional perspective view of the main body portion 21 of the casing 20. In addition, in FIG. 7, a part of the main body portion 21 including the first central partition unit 541 and the second central partition unit 542 is enlarged and displayed. FIG. 8 is a plan view of the first central partition unit 541 when viewed from one side in the axial direction. As illustrated in FIGS. 7 and 8, the first central partition unit 541 has a first cutout portion 540 at at least a part thereof. The first central partition unit 541 protrudes from the inner wall 210 of the first casing 71 and the second casing 72 to the inside, respectively. The first cutout portion 540 is provided in the first central partition unit 541 on the first casing 71 side and the first central partition unit 541 on the second casing 72 side respectively.

The motor disposing unit 44 communicates with the fan accommodating unit 41 via the first cutout portion 540. As described above, a central muffling chamber 444 is formed on one side in the axial direction from the second central partition unit 542 in the motor disposing unit 44. The central muffling chamber 444 is a space positioned on the other side of the first central partition unit 541 in the axial direction, on the lower side of the first inner partition unit 531, on the upper side of the second inner partition unit 532, and on one side of the second central partition unit 542 in the axial direction. The flow passage sectional area of the central muffling chamber 444 is greater than the flow passage sectional area of the first cutout portion 540. Accordingly, the first cutout portion 540 and the central muffling chamber 444 configure a fourth expansion muffler 404.

In addition, the second central partition unit 542 has a second cutout portion 550 at at least a part thereof. The second central partition unit 542 protrudes from the inner wall 210 of the first casing 71 and the second casing 72 to the inside, respectively. The second cutout portion 550 is provided in the second central partition unit 542 on the first casing 71 side and the second central partition unit 542 on the second casing 72 side, respectively.

The above-described third muffling chamber 440 is formed on the other side in the axial direction from the second central partition unit 542 in the motor disposing unit 44. The third muffling chamber 440 is a space positioned on the other side of the second central partition unit 542 in the axial direction, on the lower side of the first inner partition unit 531, on the upper side of the second inner partition unit 532, and on one side of the wall portion 50 in the axial direction. The third muffling chamber 440 communicates with the central muffling chamber 444 via a second cutout portion 550. The flow passage sectional area of the third muffling chamber 440 is greater than the flow passage sectional area of the second cutout portion 550. Accordingly, the second cutout portion 550 and the third muffling chamber 440 configure a fifth expansion muffler 405.

In the embodiment, the airflow oriented toward the outer side in the radial direction generated by the rotation of the fan 32 advances to the upper first muffling chamber 422 via the upper first communication path 421 as described above, or advances to the lower first muffling chamber 432 via the lower first communication path 431, and in addition to this, another part thereof advances to the motor disposing unit 44 via the first cutout portion 540. In the flow passage on the center side, the airflow that has reached the motor disposing unit 44 via the first cutout portion 540 passes through a gap between the motor disposing unit 44 and the motor 31 and is discharged to the outside of the motor module 10 via the second cutout portion 550 and the exhaust port 212.

As described above, in the embodiment, in the upper flow passage 42 and the lower flow passage 43, three expansion mufflers 401, 402, and 403 are disposed between the fan 32 and the exhaust port 212, respectively. In addition, two expansion mufflers 404 and 405 are disposed between the fan 32 and the exhaust port 212 in the flow passage on the center side through which the airflow flows via the first cutout portion 540 and the second cutout portion 550. Accordingly, noise in a wide frequency band generated in the fan 32 can be reduced. In addition, since a plurality of expansion mufflers can be configured with a simple structure and by utilizing the disposition space of the motor 31, it is possible to reduce the number of components and suppress cost while efficiently reducing the noise. In addition, assembly workability can be improved, and production efficiency can be enhanced.

Further, by forming the third muffling chamber 440 and the central muffling chamber 444 in the motor disposing unit 44 in which the motor 31 is disposed, it is possible to effectively utilize the limited space on the inside of the motor module 10 and to suppress the increase in size of the motor module 10. Furthermore, since the airflow is generated in the vicinity of the motor 31, an effect of cooling the heat generated in the motor 31 can be obtained.

Furthermore, in the upper flow passage 42, since a part of the upper first communication path 421 extends toward the inside of the upper first muffling chamber 422, the first expansion muffler 401 becomes a muffler with an inner duct. Specifically, a space below the first outer bent portion 612 and above the first inner partition unit 531 plays a role of the inner duct. Therefore, the space functions as a side branch type muffler (that is, an interference type and resonance type muffler). Therefore, the muffling effect of the first expansion muffler 401 can be finely adjusted depending on the length of the inner duct, and the muffling performance can be further improved. Further, in the lower flow passage 43, since a part of the lower first communication path 431 extends toward the inside of the lower first muffling chamber 432, the first expansion muffler 401 becomes a muffler with an inner duct. Specifically, a space above the first outer bent portion 632 and below the second inner partition unit 532 plays a role of the inner duct. Therefore, the space functions as a side branch type muffler (that is, an interference type and resonance type muffler). Therefore, the muffling effect of the first expansion muffler 401 can be finely adjusted depending on the length of the inner duct, and the muffling performance can be further improved.

In addition, by having the flow passage on the center side through which the airflow flows via the first cutout portion 540 and the second cutout portion 550, the stagnation of the airflow in the gap between the motor disposing unit 44 and the motor 31 is suppressed. Furthermore, a constant pressure gradient is formed in the flow passage from the intake port 211 to the exhaust port 212 including the periphery of the motor 31 on the inside of the motor module 10. As a result, it is possible to suppress backflow of the airflow.

Figure 8:
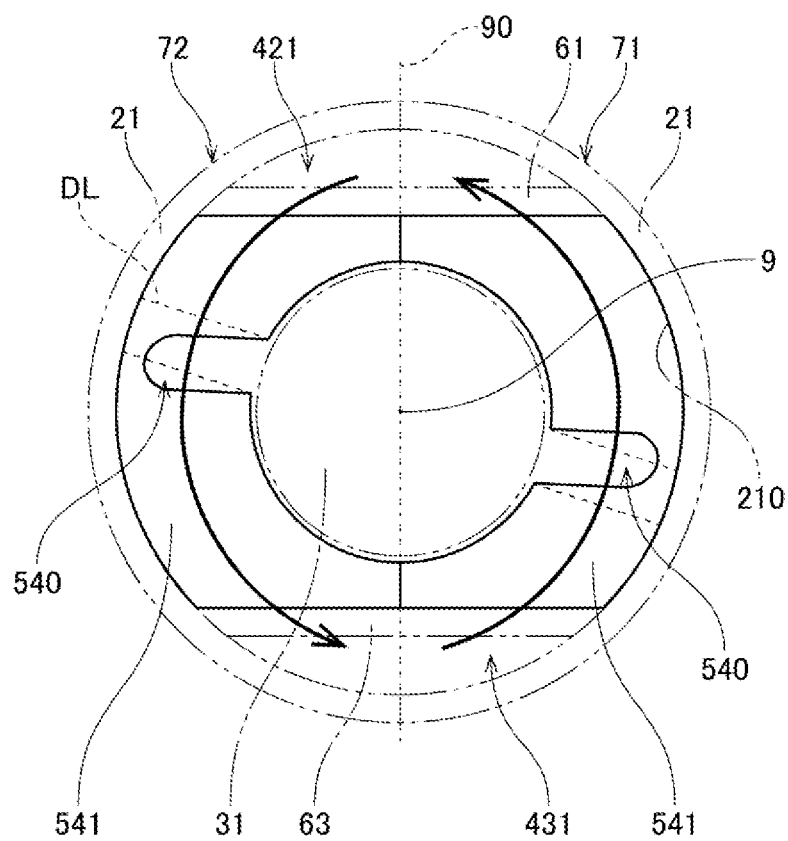
FIG. 8 is a plan view of a first central partition unit according to the first exemplary embodiment of the present disclosure when viewed from one side in an axial direction.

In addition, as illustrated in FIGS. 4 and 8, the first cutout portion 540 is positioned on an outer side of the rotating axis 9 in the radial direction and does not overlap the rotating axis 9 in the axial direction. Accordingly, the airflow can advance to the central muffling chamber 444 via the first cutout portion 540 while maintaining the turning in the circumferential direction of the airflow generated by the rotation of the fan 32. As a result, air stagnation on the inside of the casing 20 can be further suppressed and the air can be exhausted efficiently.

In addition, as illustrated in FIG. 8, the first cutout portion 540 is provided on an upstream side of the fan 32 along the rotational direction in each of the first central partition unit 541 on the first casing 71 side and the first central partition unit 541 on the second casing 72 side, that is, on the upstream side of the airflow generated by the rotation of the fan 32 in the turning direction. Accordingly, an excessive increase in the amount of air that flows to the central muffling chamber 444 via the first cutout portion 540 can be suppressed. As a result, the air can flow in the motor module 10 in a well-balanced manner.

Furthermore, as illustrated in FIG. 4, the second cutout portion 550 overlaps a part without the first cutout portion 540 of the plate-like member that forms the first central partition unit 541 when viewed from the axial direction. In other words, the second cutout portion 550 does not overlap the first cutout portion 540 when viewed from the axial direction. In addition, the second cutout portion 550 is provided on a downstream side of the fan 32 along the rotational direction in each of the second central partition units 542 on the first casing 71 side and the second central partition unit 542 on the second casing 72 side, that is, on the downstream side of the airflow generated by the rotation of the fan 32 in the turning direction. Accordingly, the airflow can further advance to the third muffling chamber 440 via the second cutout portion 550 while maintaining the flow of the airflow that obliquely advances with respect to the rotating axis 9 toward the central muffling chamber 444 via the first cutout portion 540. As a result, air stagnation on the inside of the casing 20 can be further suppressed and the air can be exhausted efficiently.

In addition, as illustrated in FIG. 8, the first cutout portion 540 is formed perpendicularly to the plane 90 in the first central partition unit 541. In other words, the first cutout portion 540 does not have a shape that radially extends in the radial direction as indicated by a broken line DL in FIG. 8. In addition, the second cutout portion 550 is formed perpendicularly to the plane 90 in the second central partition unit 542. In other words, the second cutout portion 550 does not have a shape that radially extends in the radial direction. Accordingly, when forming the first central partition unit 541 and the second central partition unit 542 by injection molding, it is possible to more easily process the first cutout portion 540 and the second cutout portion 550 compared to a case of radially cutting out the first cutout portion 540 and the second cutout portion 550 in the radial direction.

Figure 9:
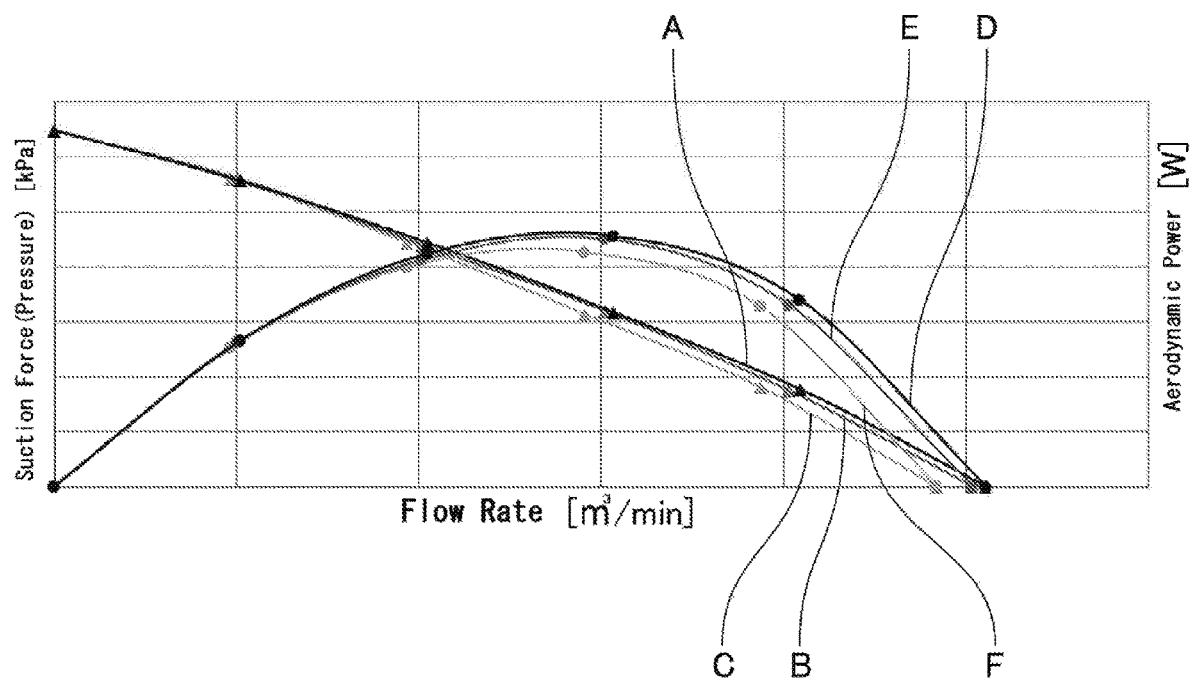
FIG. 9 is a view illustrating a result of analyzing a relationship between the presence and absence and a position of a first cutout portion in the first central partition unit according to the first exemplary embodiment of the present disclosure, and a suction force and aerodynamic power of the vacuum cleaner.

FIG. 9 is a view illustrating a result of analyzing the relationship between the presence and absence and position of the first cutout portion 540 in the first central partition unit 541 and the suction force (pressure) and aerodynamic power (workload) of the vacuum cleaner 1 having the motor module 10 of the embodiment. In addition, the left vertical axis in FIG. 9 represents the analysis result of the suction force of the vacuum cleaner 1. The right vertical axis represents the analysis result of the aerodynamic power of vacuum cleaner 1. The horizontal axis in FIG. 9 represents a flow rate of the airflow generated by the rotation of the fan 32. Further, A in FIG. 9 is a result of analyzing the suction force of the vacuum cleaner 1 in a case where the first cutout portions 540 are provided in each of the first central partition unit 541 on the first casing 71 side and the first central partition unit 541 on the second casing 72 side. In other words, in A, the first cutout portion 540 is provided at the same position as that of the embodiment. B is a result of analyzing the suction force of the vacuum cleaner 1 in a case where the first cutout portion 540 is not provided in the first central partition unit 541. Further, C in FIG. 9 is a result of analyzing the aerodynamic power of the vacuum cleaner 1 in a case where the first cutout portions 540 are provided in each of the first central partition unit 541 on the first casing 71 side and the first central partition unit 541 on the second casing 72 side. In other words, in C, the first cutout portion 540 is provided at the same position as that of the embodiment. D is a result of analyzing the aerodynamic power of the vacuum cleaner 1 in a case where the first cutout portion 540 is not provided in the first central partition unit 541. In addition, in the analysis, the second central partition unit 542 and the second cutout portion 550 are not considered.

First, the analysis results of A and B are compared with each other. As illustrated in FIG. 9, in a case where the flow rate generated by the rotation of the fan 32 is the same, the suction force in A of the vacuum cleaner 1 is higher than that in B. In addition, similarly, when comparing the analysis results of C and D with each other, when the flow rate is the same, the aerodynamic power in C of vacuum cleaner 1 is higher than that in D. As described above, in A and C, the airflow can further advance to the motor disposing unit 44 via the first cutout portion 540 while maintaining the turning in the circumferential direction of the airflow generated by the rotation of the fan 32. Meanwhile, similar to B and D, in a case where the first cutout portion 540 is not provided, the end portion on one side in the axial direction in the motor disposing unit 44 is closed, and stagnation and backflow of the air are likely to occur. In A and C, stagnation and backflow of the air on the inside of the casing 20 can be suppressed and the air can be exhausted efficiently. As a result, the flow rate exhausted from the exhaust port 212 via the inside of the dust separating unit 11, the intake port 211, and the inside of the motor module 10, from the nozzle 12 increases. In addition, the suction force of the vacuum cleaner 1, the aerodynamic power, and the amount of dust and dirt suctioned together with the airflow from the nozzle 12 increase.

The description returns to FIG. 7. The second cutout portion 550 of the embodiment is positioned on the inner side from the connecting location between the second central partition unit 542 and the inner wall 210 of the main body portion 21 on the inside of the main body portion 21. As described above, the second central partition unit 542 protrudes from the inner wall 210 of the main body portion 21 to the inside. The second cutout portion 550 is not cut out to a root part of the second central partition unit 542. In this manner, by leaving a wall between the second cutout portion 550 and the inner wall 210 of the main body portion 21, the rigidity of the main body portion 21 can be maintained. In other words, it is possible to suppress the strength in the vicinity of the connecting location between the inner wall 210 of the main body portion 21 and the second central partition unit 542 from deteriorating due to the second cutout portion 550. In addition, further, the first cutout portion 540 may be positioned on the inner side from the connecting location between the first central partition unit 541 and the inner wall 210 of the main body portion 21 on the inside of the main body portion 21.

In addition, the shape of the second cutout portion 550 in the embodiment when viewed in the axial direction is a U shape. Accordingly, a wall can be left between a circumferential edge portion of the U-shaped second cutout portion 550 and the inner wall 210 of the main body portion 21. As a result, the rigidity of the main body portion 21 can be increased. Further, in the second central partition unit 542, the second cutout portion 550 can be easily formed. Furthermore, since the second cutout portion 550 has a shape that expands toward the inner side in the radial direction, after bringing the airflow that advances to the other side in the axial direction on the inside of the motor disposing unit 44 to the vicinity of the center of the rotating axis 9 via the second cutout portion 550, the airflow can be discharged from the exhaust port 212 disposed on the outer side of the motor 31 in the radial direction. Accordingly, as the flow of the airflow becomes smoother, the pressure on the inside of the motor disposing unit 44 can be lowered. As a result, noise can be further suppressed. In addition, the shape of the second cutout portion 550 is not limited to the shape illustrated in FIGS. 7 and 8. For example, the shape of the second cutout portion 550 when viewed from the axial direction may be a V shape. Further, the shape of the first cutout portion 540 when viewed from the axial direction may be a U shape or a V shape.

2. Modification Example

Above, although the embodiments of the invention have been described as examples, the invention is not limited to the above-described embodiments.

In the above-described embodiment, in total two exhaust ports 212 are provided in the third muffling chamber 440 one by one so as to penetrate the first casing 71 and the second casing that configure the casing 20, respectively. However, the exhaust port 212 may be provided so as to penetrate either one of the first casing 71 or the second casing 72, that is, only one exhaust port may be provided or three or more exhaust ports may be provided.

Figure 10:
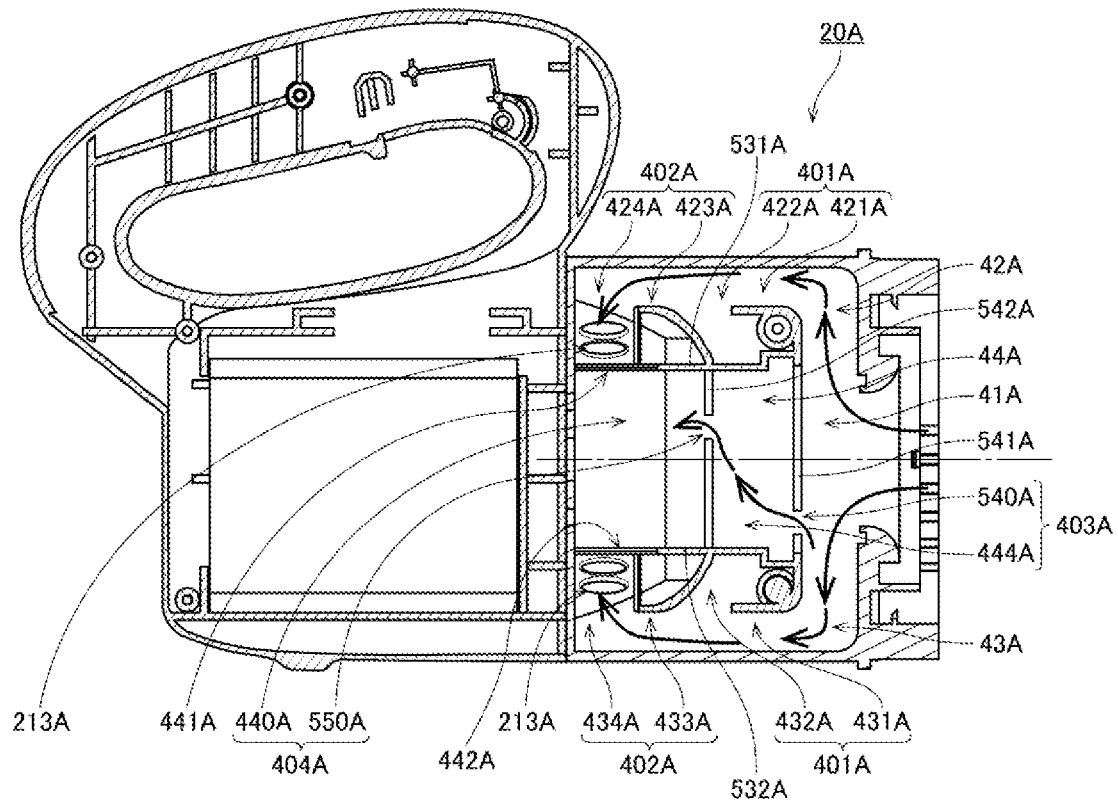
FIG. 10 is a sectional view of a casing according to a modification example of an exemplary embodiment of the present disclosure.

FIG. 10 is a sectional view of a casing 20A according to a modification example. In the casing 20A illustrated in FIG. 10, in an upper second muffling chamber 424A and a lower second muffling chamber 434A, exhaust ports 213A are provided, respectively. In a motor disposing unit 44A, the exhaust port is not provided. The exhaust port 213A is a through-hole that communicates with the inside and the outside of the casing 20A. In addition, the upper second muffling chamber 424A and the lower second muffling chamber 434A directly communicate with the exhaust ports 213A, respectively. In addition, in the modification example, the exhaust ports 213A are respectively provided two by two in the upper second muffling chamber 424A and the lower second muffling chamber 434A. However, the number of exhaust ports 213A is not limited thereto.

In addition, in the first inner partition unit 531A and the second inner partition unit 532A, through-holes that respectively penetrate at least a part in the vicinity of the end portion on the other side in the axial direction in the radial direction are provided. By the through-hole, an upper third communication path 441A that communicates with the upper second muffling chamber 424A and the motor disposing unit 44A and a lower third communication path 442A that communicates with the lower second muffling chamber 434A and the motor disposing unit 44A are formed. The motor disposing unit 44A communicates with the upper second muffling chamber 424A via the upper third communication path 441A. In addition, the motor disposing unit 44A communicates with the lower second muffling chamber 434A via the lower third communication path 442A. Furthermore, the motor disposing unit 44A communicates with the fan accommodating unit 41A via a first cutout portion 540A provided in a first central partition unit 541A. In addition, the motor disposing unit 44A is partitioned in the axial direction by a second central partition unit 542A. Accordingly, a third muffling chamber 440A is formed on the other side in the axial direction from the second central partition unit 542A, and a central muffling chamber 444A is formed on one side in the axial direction from the second central partition unit 542A. The third muffling chamber 440A indirectly communicates with the exhaust port 213 A.

In addition, an upper first muffling chamber 422A communicates with the fan accommodating unit 41A via an upper first communication path 421A, and the upper second muffling chamber 424A communicates with the upper first muffling chamber 422A via an upper second communication path 423A. A lower first muffling chamber 432A communicates with the fan accommodating unit 41A via a lower first communication path 431A, and the lower second muffling chamber 434A communicates with a lower first muffling chamber 432A via a lower second communication path 433A. Accordingly, a part of the airflow generated by the rotation of the fan (not illustrated) passes through the upper first communication path 421A, the upper first muffling chamber 422A, the upper second communication path 423A, and the upper second muffling chamber 424A in the upper flow passage 42A, and is discharged from the exhaust port 213A to the outside of the motor module. In addition, in the lower flow passage 43A, another part of the airflow generated by the rotation of the fan (not illustrated) passes through the lower first communication path 431A, the lower first muffling chamber 432A, the lower second communication path 433A, and the lower second muffling chamber 434A, and is discharged from the exhaust port 213A to the outside of the motor module. Furthermore, the remaining part of the airflow generated by the rotation of the fan (not illustrated) reaches the third muffling chamber 440A via the first cutout portion 540A, the central muffling chamber 444A, and a second cutout portion 550A in the flow passage on the center side. After this, the airflow is discharged from the exhaust port 213A of the upper second muffling chamber 424A via the upper third communication path 441A to the outside of the motor module, or is discharged from the exhaust port 213A of the lower second muffling chamber 434A via the lower third communication path 442A to the outside of the motor module.

In addition, the flow passage sectional area of the upper first muffling chamber 422A is greater than the flow passage sectional area of the upper first communication path 421A. The flow passage sectional area of the lower first muffling chamber 432A is greater than the flow passage sectional area of the lower first communication path 431A. Accordingly, the upper first communication path 421A and the upper first muffling chamber 422A, and the lower first communication path 431A and the lower first muffling chamber 432A configure a first expansion muffler 401A, respectively. In addition, the flow passage sectional area of the upper second muffling chamber 424A is greater than the flow passage sectional area of the upper second communication path 423A. The flow passage sectional area of the lower second muffling chamber 434A is greater than the flow passage sectional area of the lower second communication path 433A. Accordingly, the upper second communication path 423A and the upper second muffling chamber 424A, and the lower second communication path 433A and the lower second muffling chamber 434A configure a second expansion muffler 402A, respectively. Furthermore, the flow passage sectional area of the central muffling chamber 444A is greater than the flow passage sectional area of the first cutout portion 540A. Accordingly, the first cutout portion 540A and the central muffling chamber 444A configure a third expansion muffler 403A. In addition, the flow passage sectional area of the third muffling chamber 440A is greater than the flow passage sectional area of the second cutout portion 550A. Accordingly, the second cutout portion 550A and the third muffling chamber 440A configure a fourth expansion muffler 404A. In this manner, in the upper flow passage 42A and the lower flow passage 43A, two expansion mufflers 401A and 402A are disposed between the fan and the exhaust port 213A, respectively. In addition, two expansion mufflers 403A and 404A are disposed between the fan and the exhaust port 213A in the flow passage on the center side through which the airflow flows via the first cutout portion 540A and the second cutout portion 550A. Accordingly, noise in a wide frequency band generated in the fan can be efficiently reduced. In addition, since a plurality of expansion mufflers can be configured with a simple structure and by utilizing the disposition space of the motor, it is possible to reduce the number of components and suppress cost while efficiently reducing the noise. In addition, assembly workability can be improved, and production efficiency can be enhanced.

Figure 11:
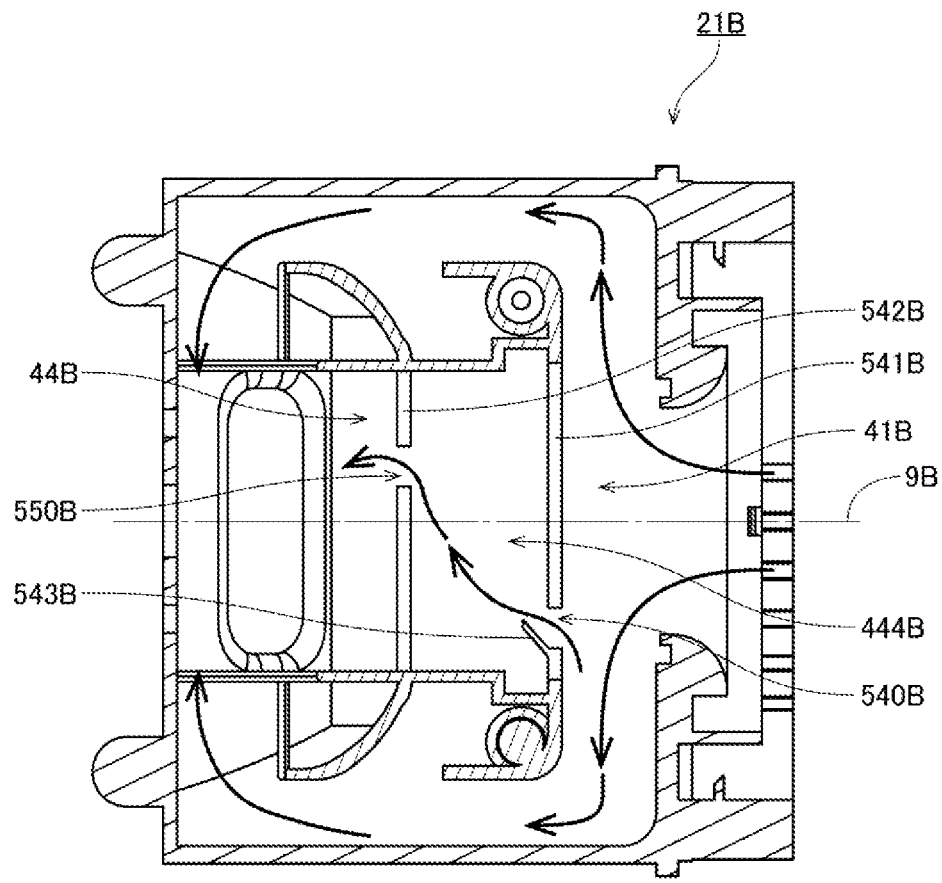
FIG. 11 is a sectional view of a main body portion of a casing according to a modification example of an exemplary embodiment of the present disclosure.

FIG. 11 is a sectional view of a main body portion 21B of a casing according to another modification example. As illustrated in FIG. 11, a first central partition unit 541B may further include a first guide portion 543B that protrudes toward the other side in the axial direction from the circumferential edge portion of a first cutout portion 540B and upward. In the modification example, the first guide portion 543B protrudes in a direction from the first cutout portion 540B to a second cutout portion 550B. Accordingly, while maintaining the turning in the circumferential direction of the airflow generated by the rotation of the fan, the airflow is made to advance obliquely to a rotating axis 9B toward a central muffling chamber 444B via the first cutout portion 540B, and furthermore, while maintaining the flow, the airflow can be guided to the third muffling chamber 440B via the second cutout portion 550B. As a result, as the flow of the airflow becomes smoother, the pressure on the inside of a motor disposing unit 44B can be lowered. As a result, noise can be further suppressed. In addition, the position and the shape of the first guide portion 543B are not limited to the position and the shape of the modification example. Further, in a second central partition unit 542B, a second guide portion (not illustrated) that protrudes from the circumferential edge portion of the second cutout portion 550B toward the other side in the axial direction may be further provided.

In the embodiments and the modification examples described above, the fan is a centrifugal fan, but the invention is not limited thereto. For example, the fan used in the motor module and the vacuum cleaner of the invention may be a mixed flow fan.

In the embodiments and the modification examples described above, on the downstream side of the fan, the flow passage is branched into the upper side, the lower side, and the center side, but the invention is not limited thereto. On the downstream side of the fan, there may be one flow passage. As a result, the flow passage may be an annular flow passage connected in the circumferential direction on the outer side of the motor. In addition, on the downstream side of the fan, the flow passage may be branched into four or more.

In the embodiments and modification examples described above, the partition unit has in total two inner partition units, two central partition units, and four outer partition units in the upper flow passage, the lower flow passage, and the flow passage on the center side. However, the number of partition units is not limited thereto. The number of partition units may be one, and may be any number of two or more.

In the embodiments and the modification examples described above, the upper first communication path and the upper second communication path are disposed along the inner wall of the main body portion, respectively. In addition, the lower first communication path and the lower second communication path are disposed along the inner wall of the main body portion, respectively. However, for example, the upper second communication path and the lower second communication path may be disposed along the inner partition unit. In other words, the second outer partition unit may extend to the inside in the radial direction and to the other side in the axial direction from the part of the inner wall of the main body portion on the other side of the first outer partition unit in the axial direction and on one side of the wall portion in the axial direction. Accordingly, the upper first communication path and the upper second communication path are disposed at different positions when viewed in the axial direction. In addition, the lower first communication path and the lower second communication path are disposed at different positions when viewed in the axial direction. In this manner, by shifting the positions in the axial direction of the first communication path and the second communication path in the upper flow passage and the lower flow passage, respectively, the muffling effect of the first expansion muffler configured with the first communication path and the first muffling chamber can be improved. In other words, the design of the motor module as a whole emphasizes the muffling effect.

In the embodiments and modification examples described above, the first outer partition unit has the first outer plate portion and the first outer bent portion. However, the first outer partition unit may have only the first outer plate portion.

The vacuum cleaner of the above-described embodiment is a handy type vacuum cleaner, but the invention is not limited thereto. Similar to the handy type, the motor module of the invention is mounted on an upright type or a stick type vacuum cleaner which suctions gas to the intake port via the intake head and the dust separating unit and discharges the gas from the exhaust port.

Further, the motor module of the invention may be mounted on a so-called canister type vacuum cleaner. In addition to the intake head and the dust separating unit, the canister type vacuum cleaner has a hose portion that connects the intake head and the dust separating unit to each other. The motor module suctions the gas to the intake port via the intake head, the hose portion, and the dust separating unit and discharges the gas from the exhaust port.

Further, the shape of the details of each member may be different from the shape illustrated in each of the drawings of the application. For example, the shapes of each portion of the intake port, the exhaust port, and the partition unit may be different from those of the embodiments and modification examples described above. Further, each of the above-described elements may be appropriately combined within a range in which inconsistency does not occur.

The invention can be applied to a motor module and a vacuum cleaner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor module comprising:
    a motor including a rotating unit that rotates around a rotating axis;
    a fan that is disposed on a first side of the motor in an axial direction and rotates together with the rotating unit; and
    a casing that accommodates the motor and the fan therein; wherein
    the casing includes:
        a tubular main body portion that extends in the axial direction;
        an intake port disposed on a first side of the fan in the axial direction;
        an exhaust port disposed on a second side of the fan in the axial direction and on an outer side of the motor in a radial direction;
        a motor disposing unit in which the motor is disposed;
        a flow passage that is a space that connects the intake port and the exhaust port to each other on an interior of the main body portion; and
        one or a plurality of partition units that are disposed on an interior of the flow passage and partition the flow passage;
    the flow passage includes a fan accommodating unit in which the fan is accommodated and which directly communicates with the intake port;
    the partition unit includes a first central partition unit that partitions the fan accommodating unit and the motor disposing unit;
    the first central partition unit includes a cutout portion provided at at least a portion of the first central partition unit;
    the motor disposing unit communicates with the fan accommodating unit via the cutout portion; and
    the partition unit further includes a second central partition unit that is spaced apart from the first central partition unit in the axial direction such that no portion of the second central partition unit overlaps a portion of the first central partition unit when viewed in a radial direction that is perpendicular to the axial direction, and the second central partition unit partitions the motor disposing unit in the axial direction.

2. The motor module according to claim 1, wherein the cutout portion is positioned on an outer side in the radial direction of the rotating axis.

3. The motor module according to claim 1, wherein the casing includes:
    a first casing; and
    a second casing; wherein the first casing and the second casing are integral and include contact surfaces that come into contact with each other on a plane that passes through the rotating axis.

4. The motor module according to claim 3, wherein
the first casing includes a projection portion that protrudes from the plane to the second casing side;
the second casing includes a recess portion recessed from the plane; and
the projection portion is fitted into the recess portion.

5. The motor module according to claim 3, wherein
the first central partition unit protrudes from an inner wall of the main body portion to the interior, in the first casing and the second casing, respectively; and
the cutout portion is provided on an upstream side of the fan along a rotational direction in the first central partition unit.

6. The motor module according to claim 3, wherein
the second central partition unit:
protrudes from an inner wall of the main body portion to the interior of the first casing and the second casing; and
includes a second cutout portion provided at at least a portion of the second central partition unit; and
a shape of the second cutout portion when viewed in the axial direction is a U shape.

7. The motor module according to claim 3, wherein
the second central partition unit:
protrudes from an inner wall of the main body portion to the interior of the first casing and the second casing; and
further includes a second cutout portion provided at at least a portion of the second central partition unit; wherein
the second cutout portion is provided on a downstream side along a rotational direction of the fan.

8. The motor module according to claim 1, wherein
the second central partition unit includes a second cutout portion provided at at least a portion of the second central partition unit; and
a space on a first side of the second central partition unit in the motor disposing unit in the axial direction communicates with a space on a second side of the second central partition unit in the motor disposing unit in the axial direction via the second cutout portion.

9. The motor module according to claim 8, wherein the second cutout portion overlaps a plate-shaped member that defines the first central partition unit in the axial direction.

10. The motor module according to claim 8, wherein
the second central partition unit protrudes from an inner wall of the main body portion to the interior; and
the second cutout portion is positioned on an inner side from a connecting location between the second central partition unit and the inner wall of the main body portion on the interior of the main body portion.

11. The motor module according to claim 1, wherein the first central partition unit further includes a first guide portion that protrudes from a circumferential edge portion of the cutout portion toward the second side in the axial direction.

12. The motor module according to claim 1, wherein the flow passage further includes:
a first muffling chamber that communicates with the fan accommodating unit via a first communication path; and
a second muffling chamber that communicates with the first muffling chamber via a second communication path and directly or indirectly communicates with the exhaust port; wherein
the exhaust port is a through-hole which is positioned in the second muffling chamber and communicates with an outside of the casing; and
the motor disposing unit defines a third muffling chamber that communicates with the second muffling chamber via a third communication path and indirectly communicates with the exhaust port.

13. The motor module according to claim 12, wherein a shape of the first communication path viewed from one side in the axial direction is a shape closed by one straight line and one circular arc.

14. The motor module according to claim 1, wherein
the exhaust port is a through-hole which is positioned in the motor disposing unit and communicates with an outside of the casing; and
the motor disposing unit defines a third muffling chamber that directly communicates with the exhaust port.

15. A vacuum cleaner comprising:
an intake head;
a dust separator that separates dust contained in an airflow from the airflow; and
the motor module according to claim 3; wherein
the casing includes a handle with a symmetrical or substantially symmetrical shape with respect to the plane;
the motor module suctions gas to the intake port via the intake head and the dust separator and discharges the gas from the exhaust port; and
the vacuum cleaner is one of a hand-held, an upright, and a stick vacuum cleaner.

16. A canister vacuum cleaner comprising:
an intake head;
a dust separator that separates dust contained in the airflow from the airflow;
a hose portion that connects the intake head and the dust separator to each other; and
the motor module according to claim 1; wherein
the motor module suctions gas to the intake port via the intake head, the hose portion, and the dust separator and discharges the gas from the exhaust port.

* * * * *